US012601870B2

(12) United States Patent
Lee et al.

(10) Patent No.: US 12,601,870 B2
(45) Date of Patent: Apr. 14, 2026

(54) ANTI-PEEP LIGHT SOURCE MODULE AND ANTI-PEEP DISPLAY DEVICE

(71) Applicants: CHAMP VISION DISPLAY INC., Miao-Li County (TW); Coretronic Corporation, Hsin-Chu (TW)

(72) Inventors: Hsin-Hung Lee, Miao-Li County (TW); Chung-Hao Wu, Miao-Li County (TW); Chun-Chien Liao, Miao-Li County (TW); Ming-Huei Shiu, Hsin-Chu (TW)

(73) Assignees: CHAMP VISION DISPLAY INC., Miao-Li County (TW); Coretronic Corporation, Hsin-Chu (TW)

( * ) Notice: Subject to any disclaimer, the term of this patent is extended or adjusted under 35 U.S.C. 154(b) by 369 days.

(21) Appl. No.: 18/530,142

(22) Filed: Dec. 5, 2023

(65) Prior Publication Data

US 2024/0192434 A1 Jun. 13, 2024

(30) Foreign Application Priority Data

Dec. 12, 2022 (TW) ................................. 111147526

(51) Int. Cl.
*F21V 8/00* (2006.01)
(52) U.S. Cl.
CPC ................................. *G02B 6/0063* (2013.01)
(58) Field of Classification Search
CPC .. G02B 6/0063; G02B 6/0058; G02B 6/0076; G02F 1/1323
See application file for complete search history.

(56) References Cited

U.S. PATENT DOCUMENTS 10,705,283 B2 * 7/2020 Liu ...................... G02B 6/0053
2003/0227768 A1 12/2003 Hara et al.
(Continued)

FOREIGN PATENT DOCUMENTS

CN 112882286 A * 6/2021 ........... G02B 6/0053
CN 116626802 8/2023
(Continued)

OTHER PUBLICATIONS

Chun-Chung Hsiao et al., "Display Apparatus", Unpublished U.S. Appl. No. 18/908,707, filed Oct. 7, 2024.
(Continued)

*Primary Examiner* — Sung H Pak
(74) *Attorney, Agent, or Firm* — JCIPRNET

(57) ABSTRACT

An anti-peep light source module and an anti-peep display device having an anti-peep function and good image quality are provided. The anti-peep light source module includes a light guide plate, a first light emitting element, a second light emitting element, a plurality of optical microstructures and a first surface. The light guide plate has a first light incident surface and a second light incident surface. Each of the optical microstructures has a first optical surface facing the first light incident surface and a second optical surface facing the second light incident surface. A magnitude of a first included angle between the first optical surface and the first surface and a magnitude of a second included angle between the second optical surface and the first surface gradually change as getting farther away from the first surface.

20 Claims, 15 Drawing Sheets

(56) References Cited

U.S. PATENT DOCUMENTS

| | | | |
|---|---|---|---|
| 2007/0008456 A1 | 1/2007 | Lesage et al. | |
| 2019/0227222 A1 | 7/2019 | Zhu et al. | |
| 2020/0005718 A1* | 1/2020 | Fattal | G02B 6/0076 |
| 2020/0233142 A1 | 7/2020 | Liao et al. | |
| 2022/0365268 A1* | 11/2022 | Woodgate | G02B 6/0055 |
| 2024/0036390 A1 | 2/2024 | Hai | |
| 2024/0201432 A1 | 6/2024 | Liu et al. | |
| 2025/0076560 A1 | 3/2025 | Liu et al. | |
| 2025/0184469 A1 | 6/2025 | Wu et al. | |

FOREIGN PATENT DOCUMENTS

| | | |
|---|---|---|
| TW | 201344307 | 11/2013 |
| TW | I480634 | 4/2015 |
| TW | 201629592 | 8/2016 |
| TW | M595237 | 5/2020 |
| TW | M623305 | 2/2022 |
| TW | M624394 | 3/2022 |
| TW | M628809 | 6/2022 |
| TW | 202303034 | 1/2023 |
| TW | M639487 | 4/2023 |

OTHER PUBLICATIONS

Chung-Hao Wu et al., "Light Source Module and Display Apparatus", Unpublished U.S. Appl. No. 18/955,894, filed Nov. 21, 2024.
"Office Action of Taiwan Related Application, Application No. 112146751", issued on Oct. 9, 2024, p. 1-p. 8.
"Office Action of U.S. Related Application, U.S. Appl. No. 18/908,707", issued on Jul. 22, 2025, p. 1-p. 16.

* cited by examiner

100

MSL2

MSL3

MSL4

OS1

OS2

MSR1

OS1

OS2

MSC

OS1

OS2

MSL1

MSR4

MSR3

MSR2

MSL2

MSL3

MSL4

MSR1

MSC

MSL1

MSR4

MSR3

MSR2

ANTI-PEEP LIGHT SOURCE MODULE AND ANTI-PEEP DISPLAY DEVICE

CROSS-REFERENCE TO RELATED APPLICATION

This application claims the priority benefit of Taiwan application serial no. 111147526, filed on Dec. 12, 2022. The entirety of the above-mentioned patent application is hereby incorporated by reference herein and made a part of this specification.

BACKGROUND

Technical Field

The invention relates to an optical module and an electronic device, and particularly relates to an anti-peep light source module and an anti-peep display device.

Description of Related Art

Along with development of science and technology, display devices have become commonly used electronic devices in daily life. At present, some display devices may provide an anti-peep function to maintain user's viewing privacy, and its scope of application is also developed from notebook computers (NB), liquid crystal monitors towards portable consumer audio-visual products, such as mobile phones, tablets, etc. However, since a viewing angle of a backlight module in the display device is limited by a design of an optical film, the backlight module cannot be easily changed and replaced. Therefore, the general anti-peep function is realized by adding an anti-peep optical film or an anti-peep optical module to shield large-angle light provided by the display device, so as to avoid being viewed by others.

For example, currently, there are two anti-peep display technologies for display devices, where one is to add an anti-peep optical sheet composed of a plurality of shutter-like ultra-fine fence structures on a display screen. In this way, after light passes through the fine fences, since the light of left and right viewing angles is blocked by the fences, a user may only use the display screen normally within an angle of about 60 degrees from the front, and bystanders will only see a dark image due to that the light is blocked. However, in this way, a brightness of the image at the front viewing angle will also be decreased, and a sharpness of screen display is also decreased. In addition, the anti-peep optical sheet is relatively inconvenient to carry, and setting thereof will also affect and destroy an aesthetic feeling of the original design of the screen.

The other anti-peep display technology is to add an anti-peep optical module composed of a liquid crystal viewing angle switcher in the display device. The liquid crystal viewing angle switcher changes a polarization state of the light passing there through by switching a state of the liquid crystal, so that the light exiting the liquid crystal viewing angle switcher from different angles has different transmittance relative to the polarizer, and the user may see different screen brightness at different angles. In this way, by using brightness ratios of different angles, users at a normal viewing angle may use the screen normally, but bystanders at large angles will be assigned with an extremely low brightness and cannot watch, thereby achieving the anti-peep effect. However, when the anti-peep function of the anti-peep technology is turned on, for users watching from the normal viewing angle, the brightness of the screen will be slightly reduced and left and right sides of the displayed image may be interfered, which will affect the display quality of the displayed image. Moreover, regarding a screen position at the same side as the bystander, this anti-peep technology cannot completely cover the displayed image because of a smaller viewing angle and insufficient brightness reduction.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an anti-peep light source module and an anti-peep display device, which have an anti-peep function and good image quality.

In order to achieve one or a portion of or all of the objects or other objects, an embodiment of the invention provides an anti-peep light source module. The anti-peep light source module includes a light guide plate, a first light emitting element, a second light emitting element and a plurality of optical microstructures. The light guide plate has a first light incident surface, a second light incident surface and a first surface, where the first light incident surface and the second light incident surface are opposite to each other, the first surface connects the first light incident surface and the second light incident surface, and the light guide plate has a first region and a second region, the first region is closer to the first light incident surface than the second region, and the second region is closer to the second light incident surface than the first region. The first light emitting element faces the first light incident surface for providing a first light beam, and the first light beam enters the light guide plate through the first light incident surface. The second light emitting element faces the second light incident surface for providing a second light beam, and the second light beam enters the light guide plate through the second light incident surface. The plurality of optical microstructures are disposed on the first surface, where each of the optical microstructures has a first optical surface and a second optical surface, the first optical surface faces the first light incident surface, and the second optical surface faces the second light incident surface, and the first optical surface is located between the first light incident surface and the second optical surface, where there is a first included angle between the first optical surface of each of the optical microstructures and the first surface, there is a second included angle between the second optical surface and the first surface, and a magnitude of the first included angle and a magnitude of the second included angle gradually change as getting farther away from the first surface.

In order to achieve one or a portion of or all of the objects or other objects, an embodiment of the invention provides an anti-peep display device. The anti-peep display device is configured to be switched between an anti-peep display mode and a normal display mode, and the anti-peep display device includes a display module and the aforementioned anti-peep light source module. The display module is configured to provide a display light beam. The anti-peep light source module is disposed on a transmission path of the display light beam.

Based on the above description, in an embodiment of the invention, through the configuration of the optical microstructures of the anti-peep light source module, and under the anti-peep display mode, the anti-peep display device may enable at least a part of the anti-peep light beams to be fully reflected via the optical surface and then emitted from the light guide plate in an appropriate viewing angle based on a situation of a light emitting position with different distances from the light incident surface, so that the images viewed by bystanders may also be shielded due to the existence of the high-brightness anti-peep light beam and the bystanders may view an almost completely white image, thereby achieving the anti-peep function. In addition, since a light emitting angle of the anti-peep light beam does not include a normal viewing angle (with a direction coincided with a normal line perpendicular to the light emitting surface), it will not affect the viewing quality of users viewing the display image at the normal viewing angle. In this way, while the anti-peep display device may provide the anti-peep function, it may also provide an image with good image quality for users watching from the normal viewing angle.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
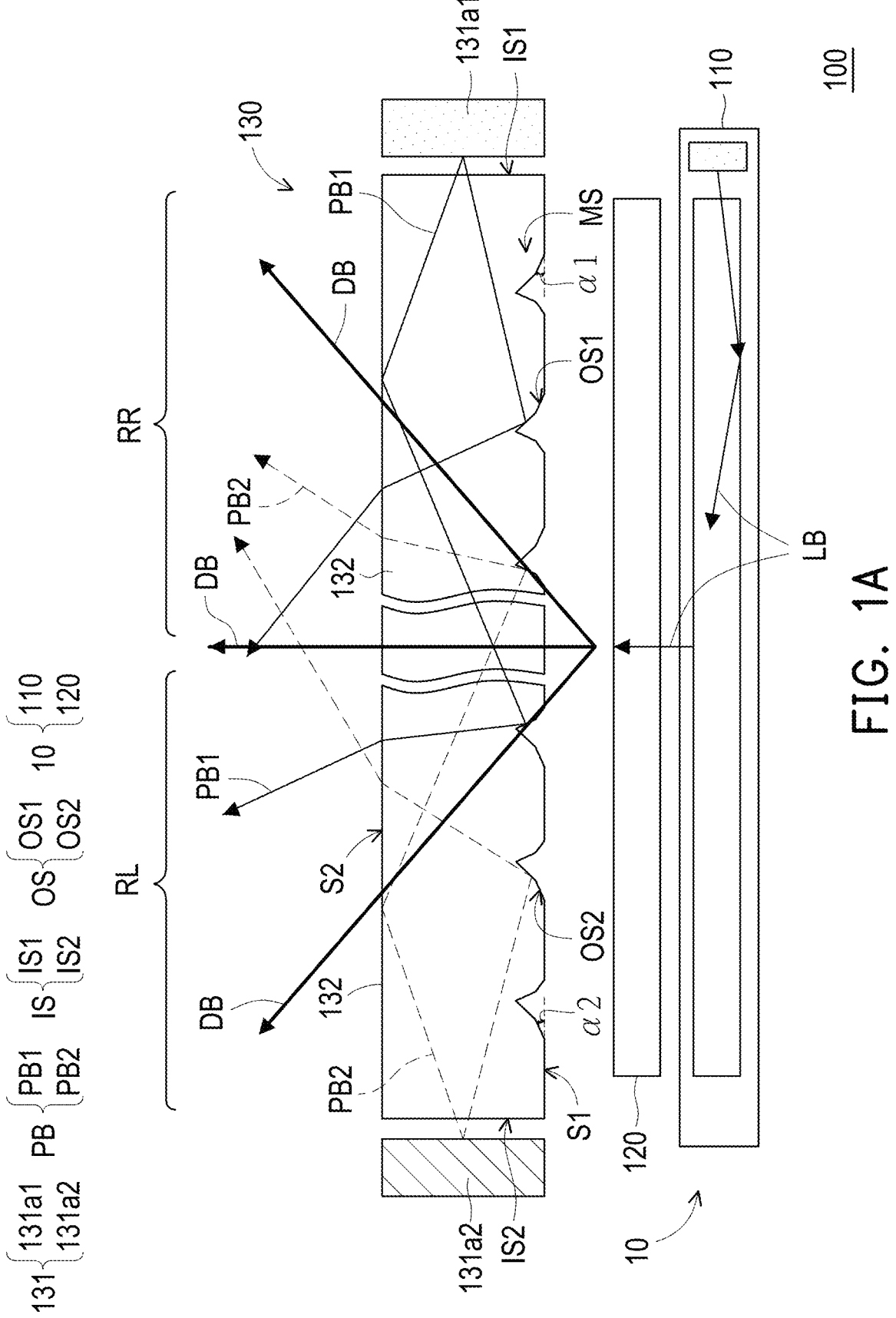
FIG. 1A is a schematic diagram of an optical path of an anti-peep display device in an anti-peep display mode according to an embodiment of the invention.
Figure 1B:
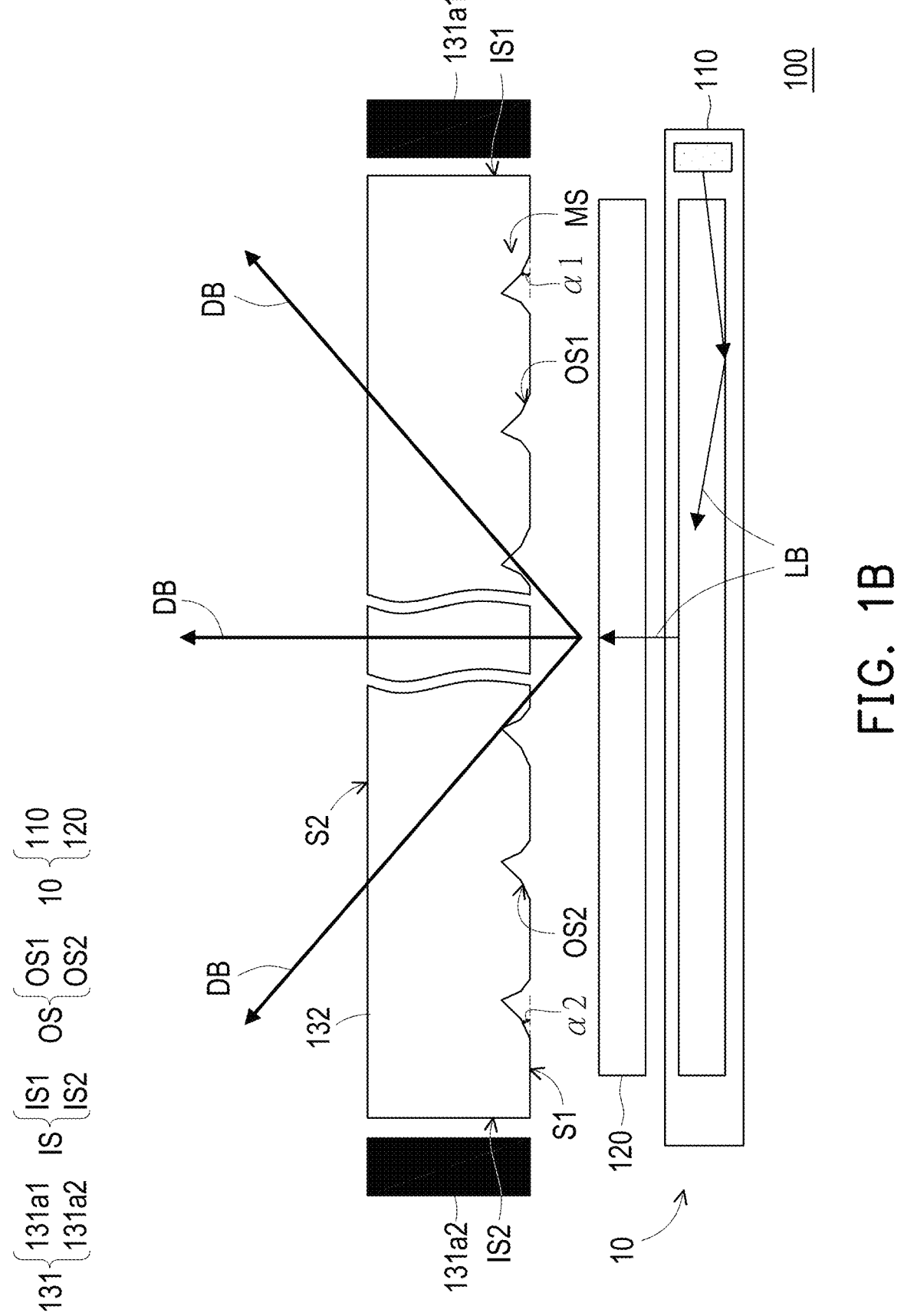
FIG. 1B is a schematic diagram of an optical path of an anti-peep display device in a normal display mode according to an embodiment of the invention.
Figure 2A:
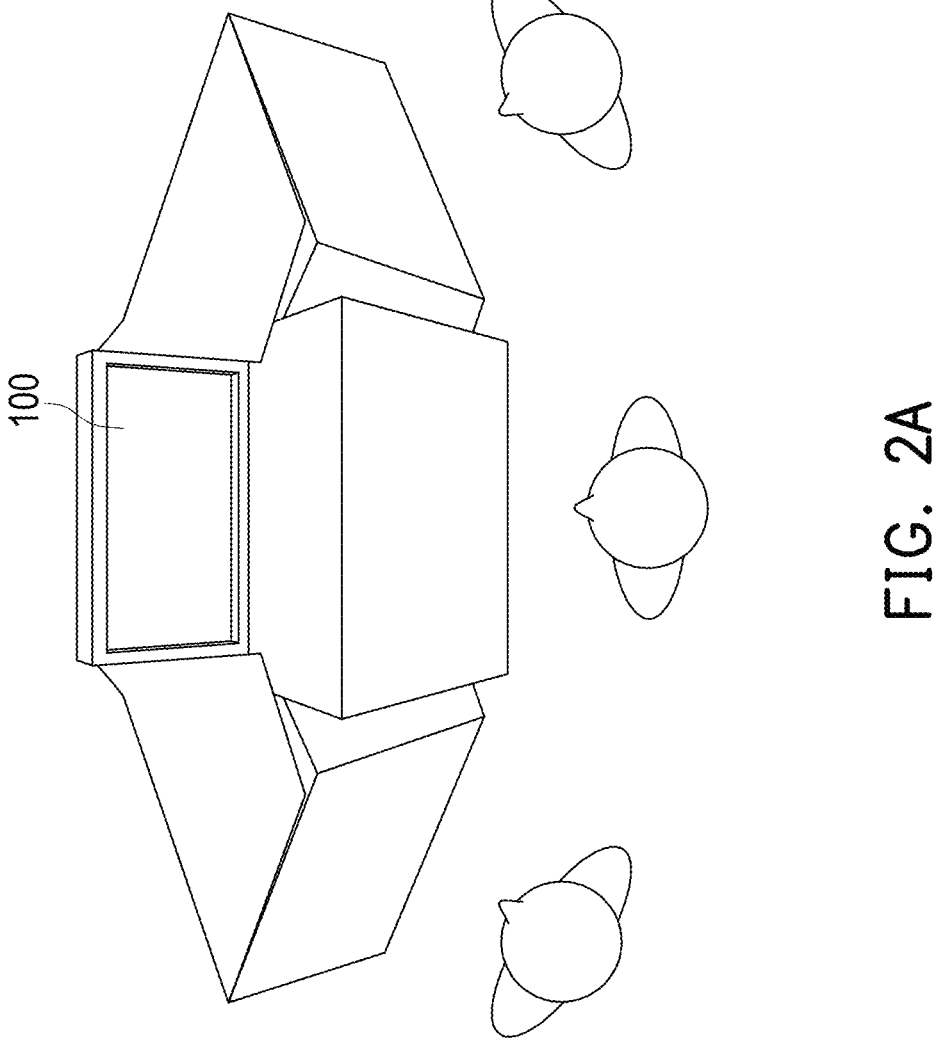
FIG. 2A and FIG. 2B are schematic diagrams of viewing situations of users when the anti-peep display device is in the anti-peep display mode and the normal display mode, respectively.
Figure 2B:
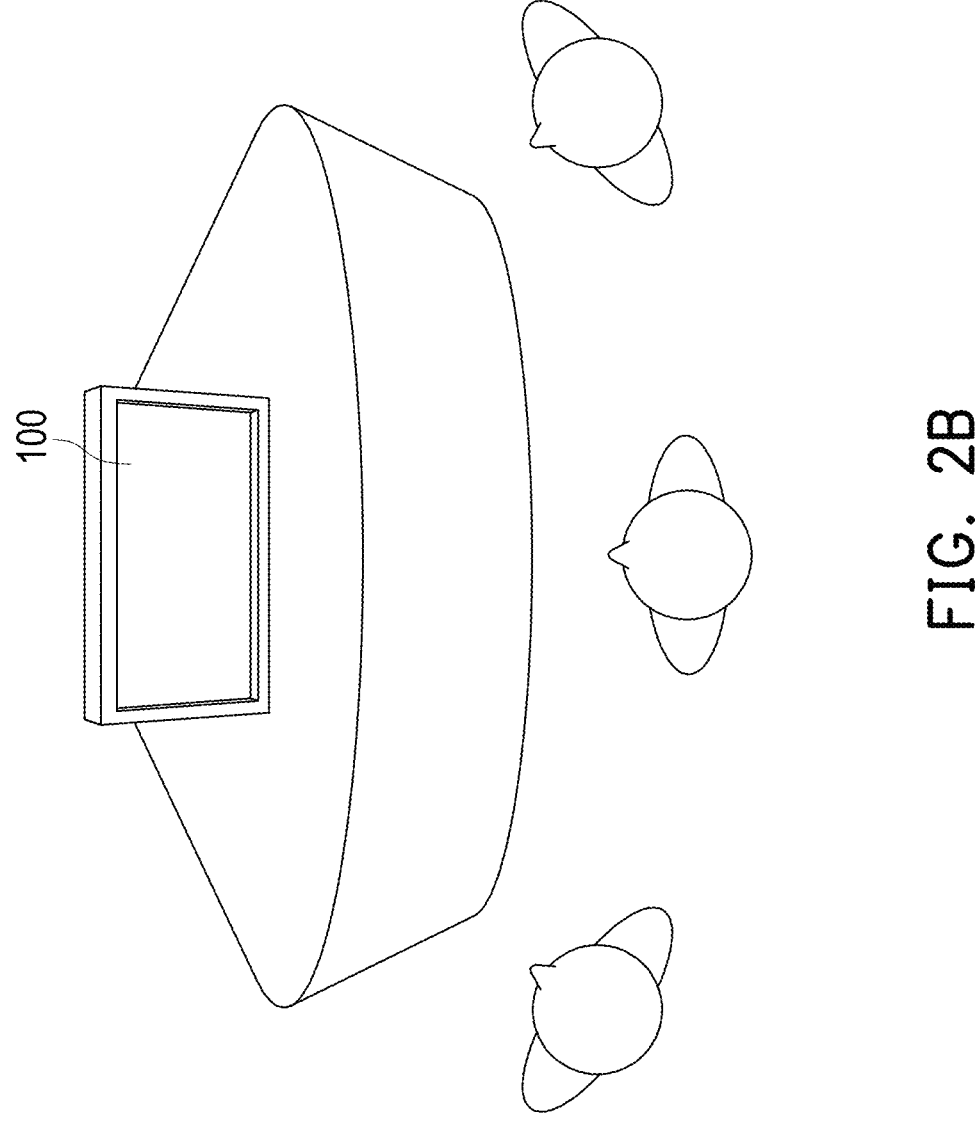

FIG. 1A is a schematic diagram of an optical path of an anti-peep display device in an anti-peep display mode according to an embodiment of the invention. FIG. 1B is a schematic diagram of an optical path of an anti-peep display device in a normal display mode according to an embodiment of the invention. FIG. 2A and FIG. 2B are schematic diagrams of viewing situations of users when the anti-peep display device is in the anti-peep display mode and the normal display mode, respectively. Referring to FIG. 1A and FIG. 1B, an anti-peep display device 100 of the embodiment may be switched between the anti-peep display mode and the normal display mode. Specifically, as shown in FIG. 1A and FIG. 1B, in the embodiment, the anti-peep display device 100 includes a display module 10 and an anti-peep light source module 130. The display module 10 is used for providing a display light beam DB. The anti-peep light source module 130 is disposed on a transmission path of the display light beam DB. For example, in the embodiment, the display module 10 includes a backlight light source module 110 and a display panel 120, where the display panel 120 is located between the backlight light source module 110 and the anti-peep light source module 130. The backlight light source module 110 is used to provide an illumination light beam LB. The display panel 120 is disposed on a transmission path of the illumination light beam LB. The illumination light beam LB passes through the display panel 120 to form the display light beam DB. In this way, when the display light beam DB is emitted from the anti-peep display device 100, a user may watch an image displayed by the anti-peep display device 100. In other embodiments, the display module 10 is, for example, a self-luminous display module. At this time, the display module 10 may directly provide the display light beam DB without the backlight light source module 110.

To be specific, as shown in FIG. 1A and FIG. 2A, in the embodiment, in the anti-peep display mode, the anti-peep display device 100 provides the display light beam DB and an anti-peep light beam PB at the same time, where the anti-peep light beam PB may prevent bystanders located outside a normal viewing angle from peeping the image displayed by the anti-peep display device 100. Moreover, as shown in FIG. 1B and FIG. 2B, in the normal display mode, the anti-peep display device 100 only provides the display light beam DB, therefore, the users at different viewing angles may all normally watch the images displayed by the anti-peep display device 100.

The mechanism of how the anti-peep light beam PB enables the anti-peep display device 100 to provide the anti-peep function under the anti-peep display mode will be further explained below with reference to FIG. 3 to FIG. 8B.

Figure 3:
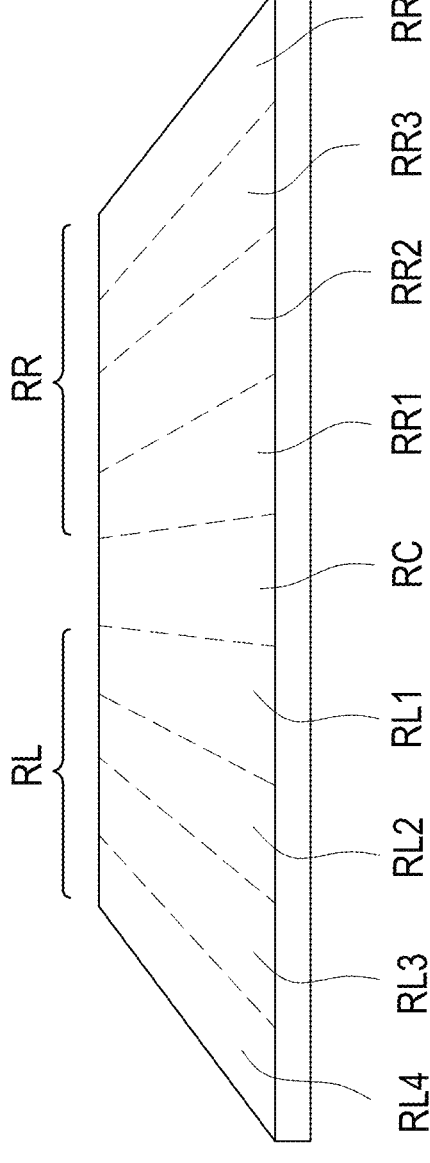
FIG. 3 is a schematic three-dimensional view of different regions of a light guide plate of FIG. 1A.
Figure 4C:
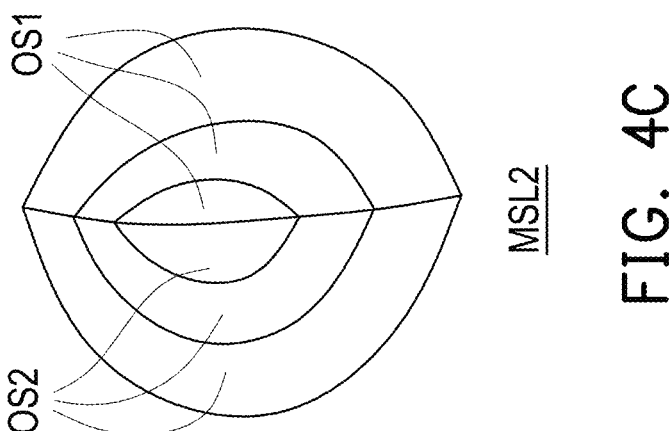
FIG. 4A to FIG. 4I are schematic top views of optical microstructures in different regions of the light guide plate of FIG. 1A.
Figure 4B:
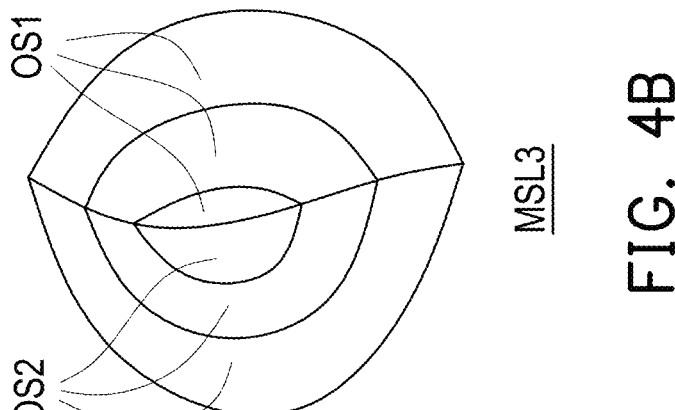
Figure 4A:
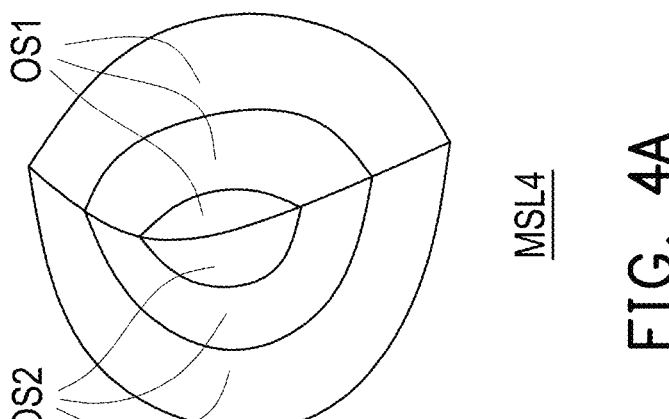
Figure 4F:
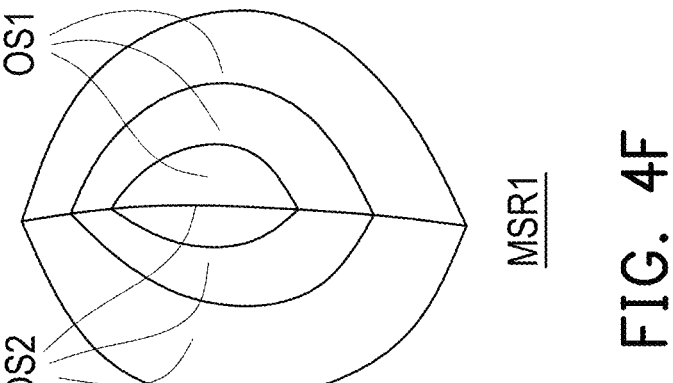
Figure 4E:
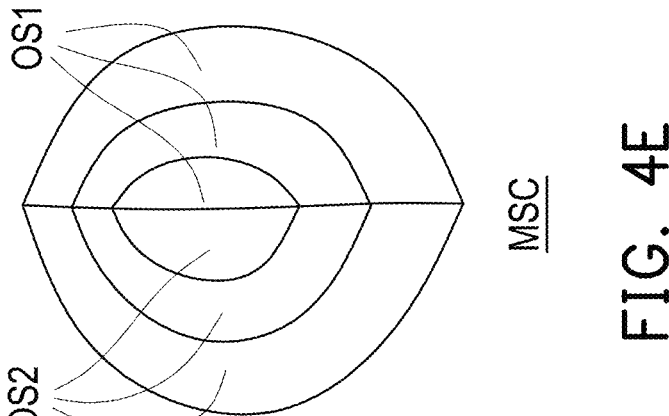
Figure 4D:
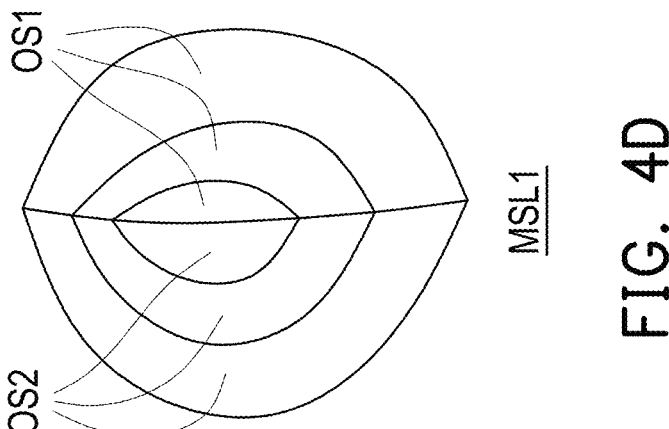
Figure 4I:
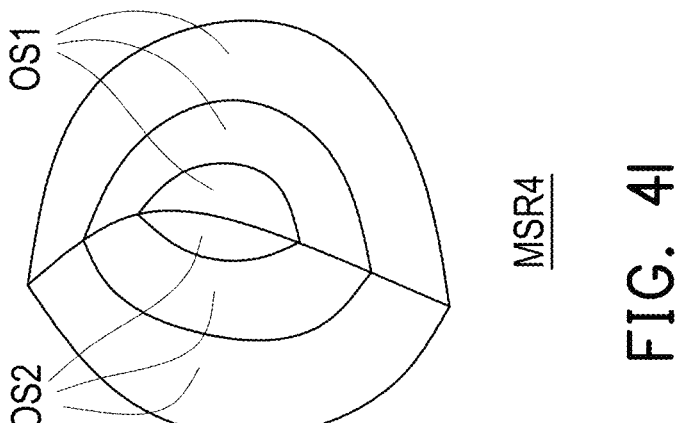
Figure 4H:
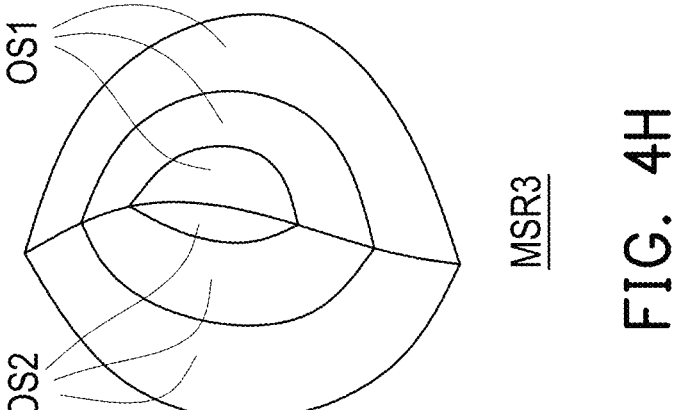
Figure 4G:
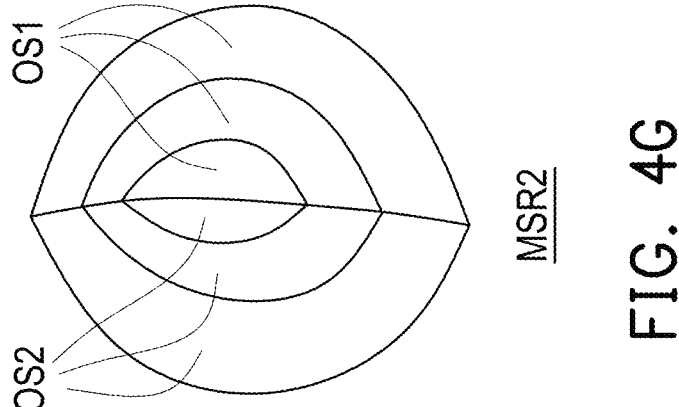
Figure 5C:
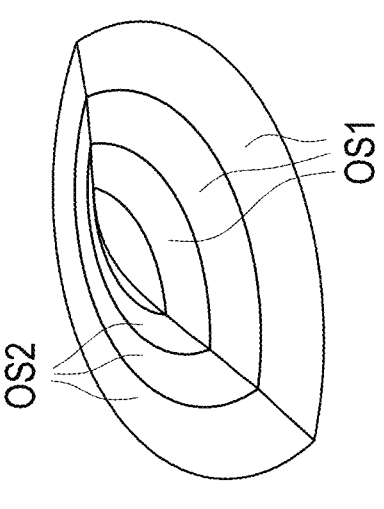
FIG. 5A to FIG. 5I are schematic three-dimensional views of optical microstructures in different regions of the light guide plate of FIG. 1A.
Figure 5B:
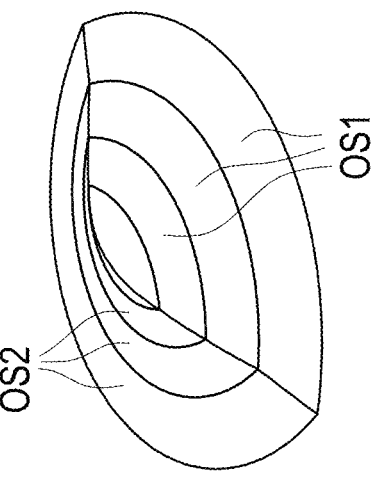
Figure 5A:
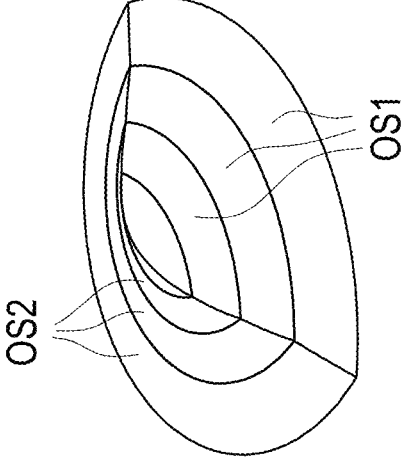
Figure 5F:
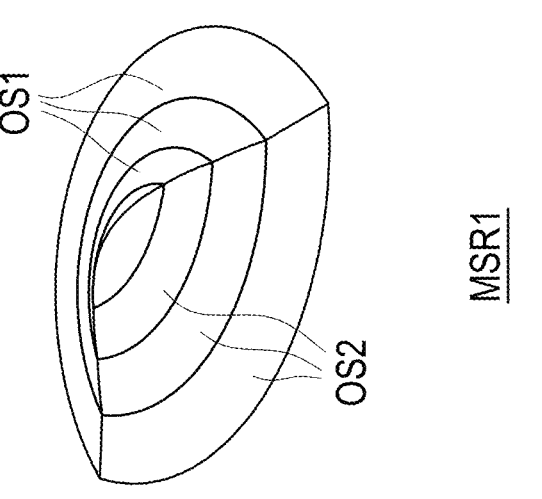
Figure 5E:
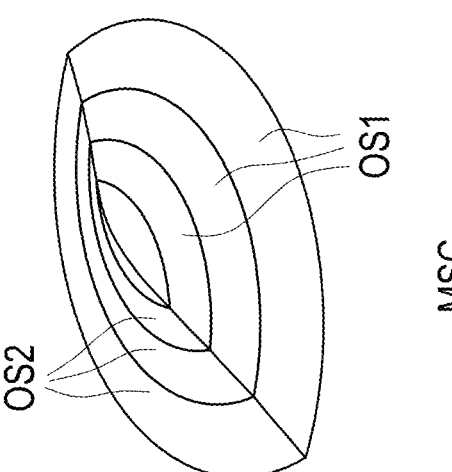
Figure 5D:
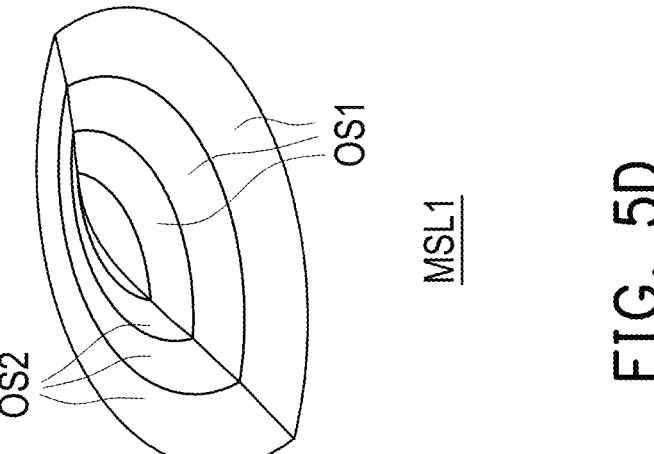
Figure 5I:
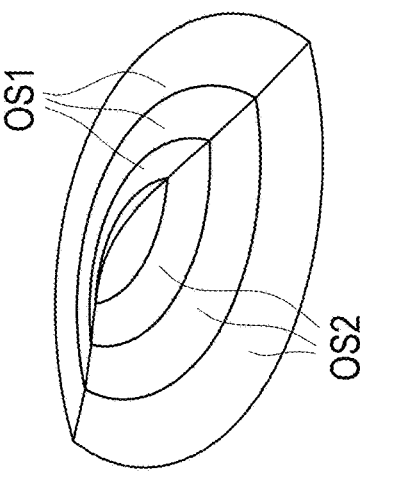
Figure 5H:
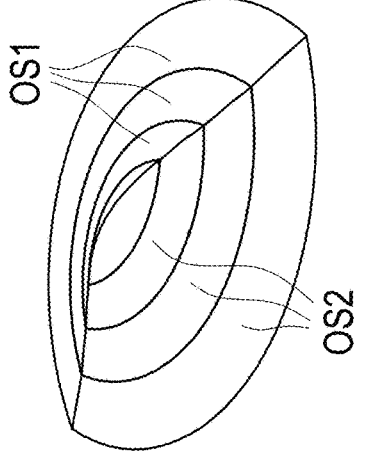
Figure 5G:
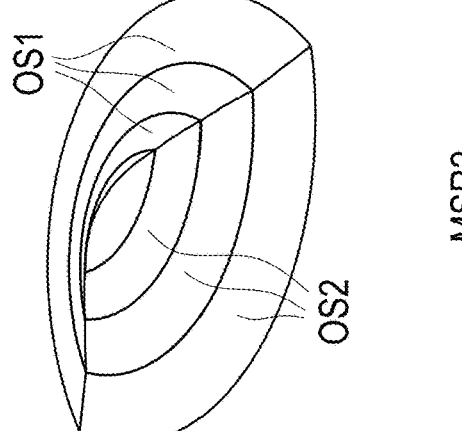
Figure 6B:
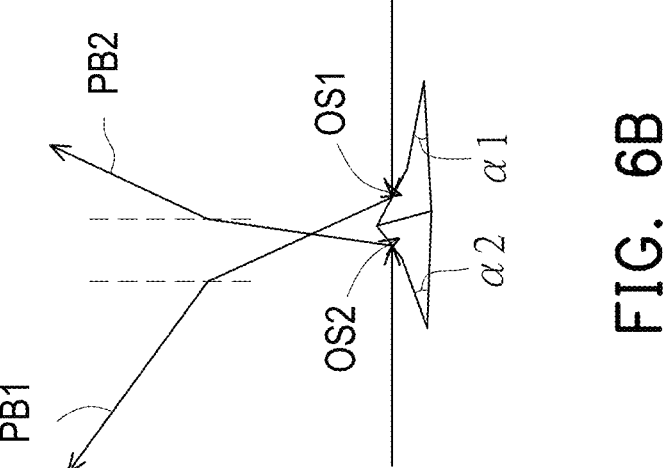
FIG. 6A and FIG. 6B are respectively schematic diagrams of light paths of light beams passing through a first optical surface and a second optical surface of the optical microstructure in FIG. 1A.
Figure 6A:
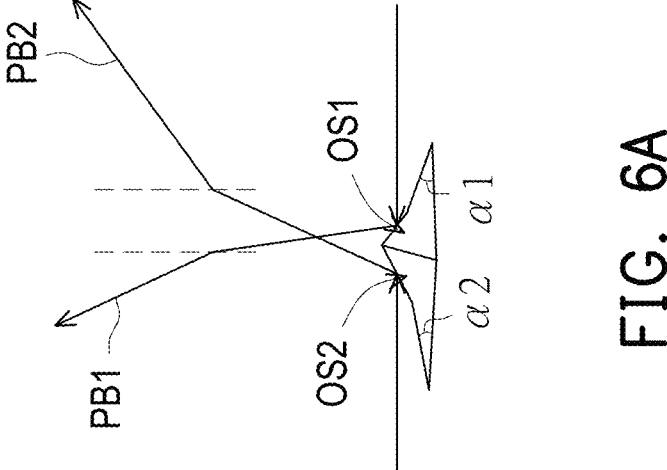
Figure 7A:
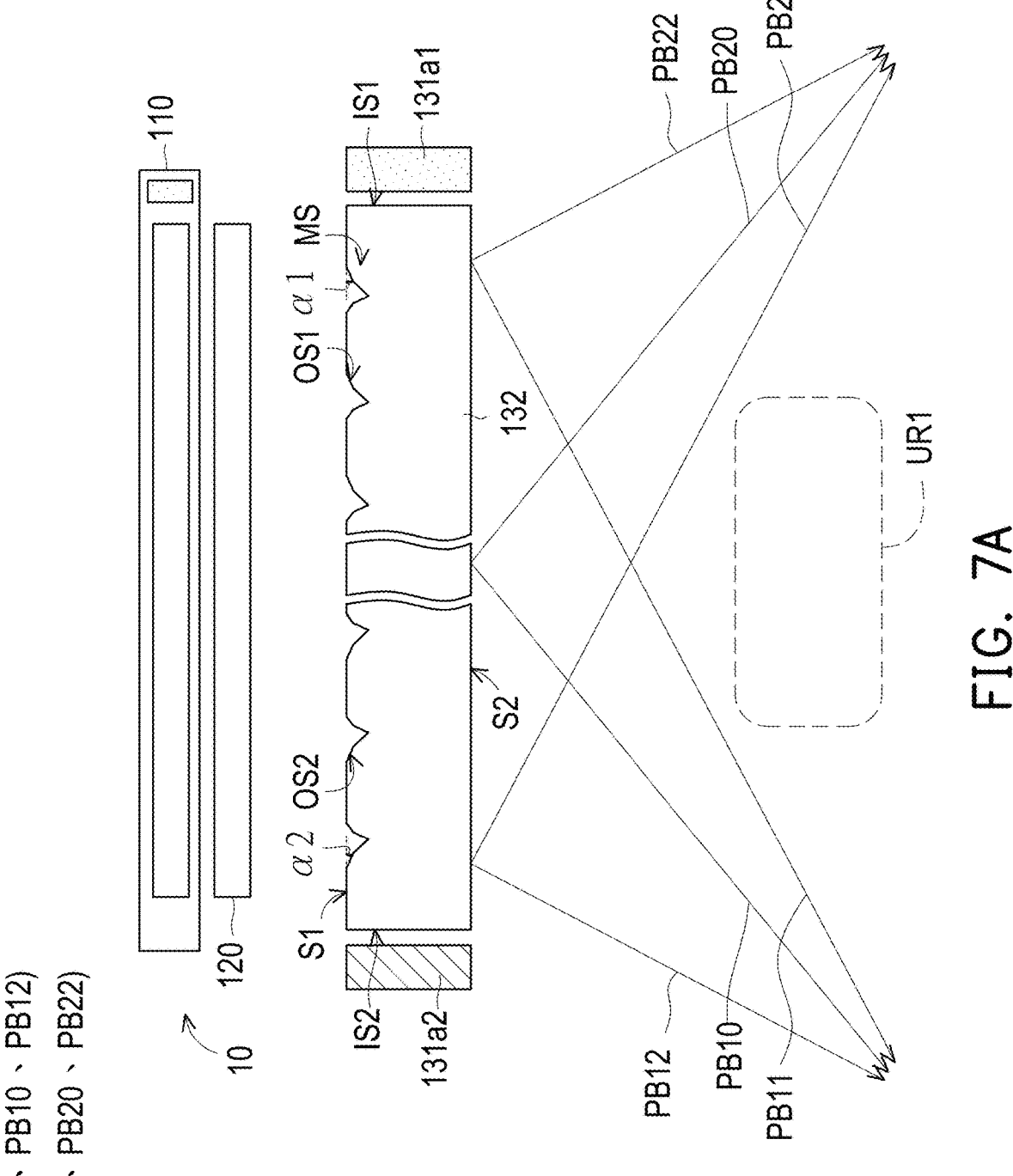
FIG. 7A and FIG. 7B are respectively schematic diagrams of light paths of an anti-peep display device in the anti-peep display mode according to an embodiment of the invention and a comparative example.
Figure 7B:
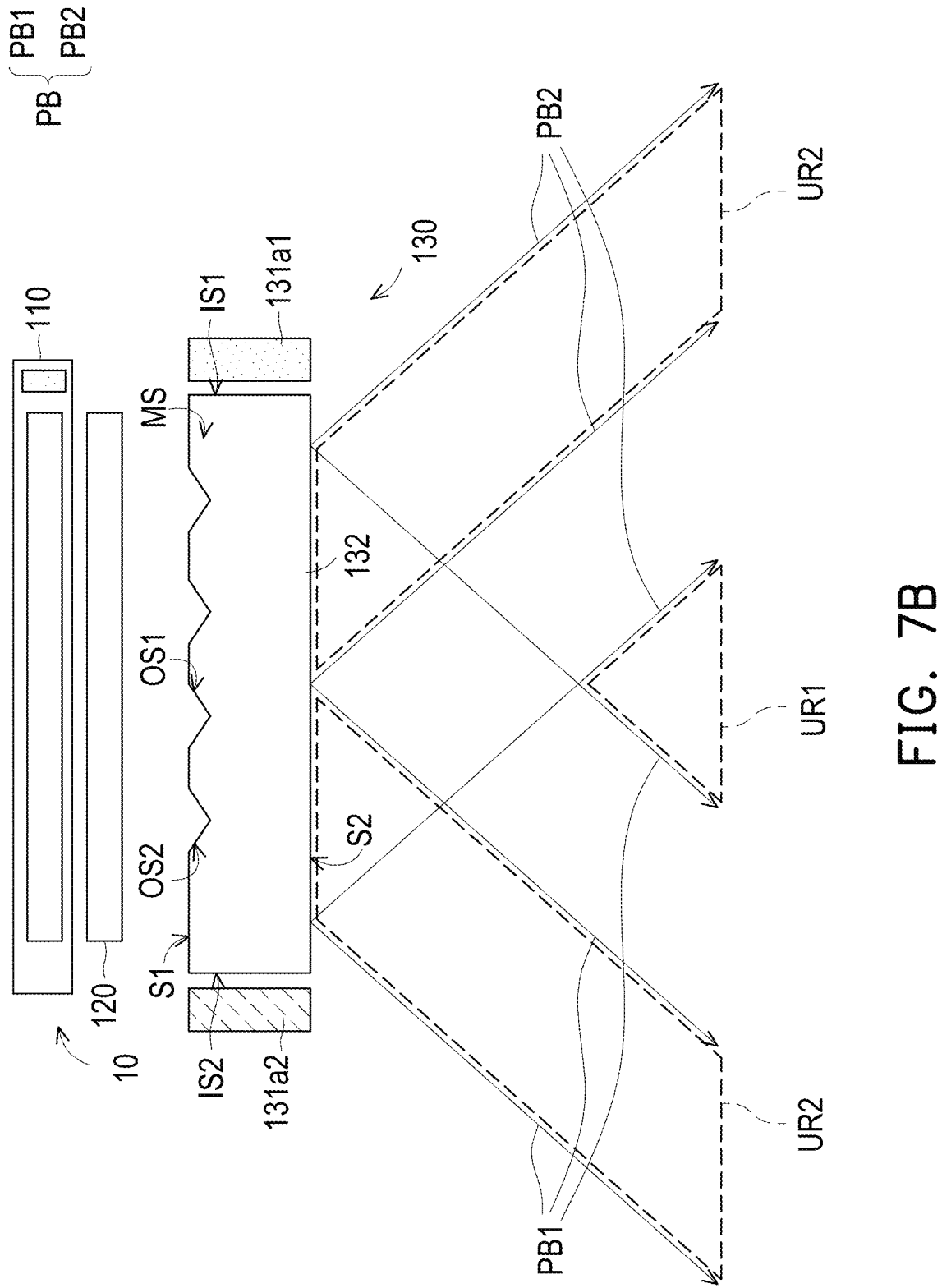
Figure 8B:
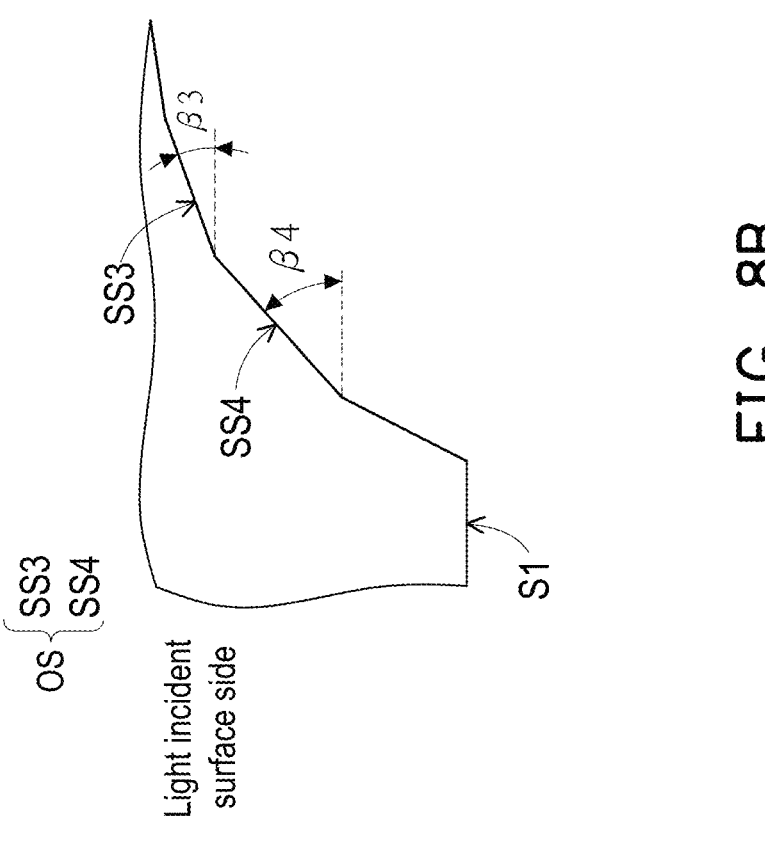
FIG. 8A and FIG. 8B are schematic cross-sectional views of the first optical surface and the second optical surface of the optical microstructure of FIG. 1A.
Figure 8A:
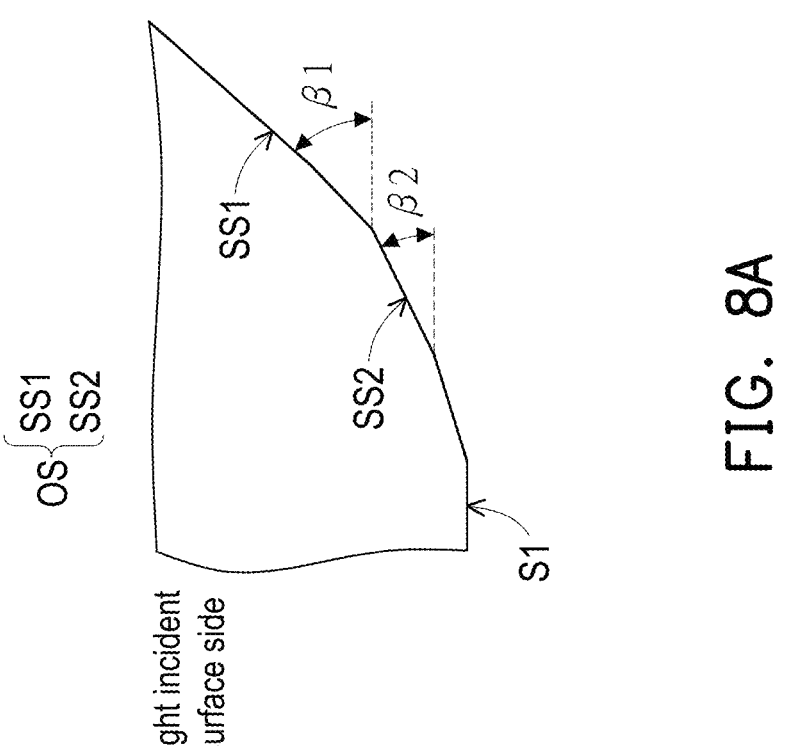

FIG. 3 is a schematic three-dimensional view of different regions of the light guide plate of FIG. 1A. FIG. 4A to FIG. 4I are schematic top views of optical microstructures in different regions of the light guide plate of FIG. 1A. FIG. 5A to FIG. 5I are schematic three-dimensional views of optical microstructures in different regions of the light guide plate of FIG. 1A. FIG. 6A and FIG. 6B are respectively schematic diagrams of light paths of light beams via a first optical surface and a second optical surface of the optical microstructure in FIG. 1A. FIG. 7A and FIG. 7B are respectively schematic diagrams of light paths of an anti-peep display device in the anti-peep display mode according to an embodiment of the invention and a comparative example. FIG. 8A and FIG. 8B are schematic cross-sectional views of the first optical surface and the second optical surface of the optical microstructure of FIG. 1A. Specifically, as shown in FIG. 1A and FIG. 1B, in the embodiment, the anti-peep light source module 130 includes at least one light emitting element 131, a light guide plate 132 and a plurality of optical microstructures MS. For example, the light emitting element 131 may be composed of a single light emitting diode (LED). A material of the light guide plate 132 includes polycarbonate (PC), polymethyl methacrylate (PMMA), glass, or other resin materials with high light transmittance. To be specific, in the embodiment, the at least one light emitting element 131 is used for providing an anti-peep light beam PB. For example, as shown in FIG. 1A, in the embodiment, the at least one light emitting element 131 includes a first light emitting element 131a1 and a second light emitting element 131a2, i.e., the anti-peep light beam PB may include a first light beam PB1 and a second light beam PB2, which are respectively provided by the first light emitting element 131a1 and the second light emitting element 131a2. To be specific, in the embodiment, the light guide plate 132 has at least one light incident surface IS and a first surface S1 and a second surface S2 opposite to each other, where the at least one light incident surface IS connects the first surface S1 and the second surface S2, where the first surface S1 faces the display panel 120. The second surface S2 is a light-emitting surface. For example, as shown in FIG. 1A, the at least one light incident surface IS includes a first light incident surface IS1 and a second light incident surface IS2, the first light incident surface IS1 and the second light incident surface IS2 are opposite to each other (the first light incident surface IS1 and the second light incident surface IS2 are, for example, parallel to each other), the first surface S1 connects the first light incident surface IS1 and the second light incident surface IS2, and the second surface S2 connects the first light incident surface IS1 and the second light incident surface IS2. The first light emitting element 131a1 faces the first light incident surface S1, and the first light beam PB1 provided by the first light emitting element 131a1 enters the light guide plate 132 through the first light incident surface S1. The second light emitting element 131a2 faces the second light incident surface IS2, and the second light beam PB2 provided by the second light emitting element 131a2 enters the light guide plate 132 through the second light incident surface IS2.

On the other hand, as shown in FIG. 1A, in the embodiment, a plurality of optical microstructures MS are disposed on the first surface S1, where each of the optical microstructures MS has an optical surface OS, and the optical surface OS faces the light incident surface IS. For example, in the embodiment, the optical microstructure MS is a concave microstructure with a round bottom and an olive-shaped curved surface, and may be formed on the light guide plate 132 by thermocompression molding, which means that in the embodiment, the concave microstructure is a structure that is recessed from the first surface S1 toward the inside of the light guide plate 132.

Moreover, as shown in FIG. 1A and FIG. 1B, in the embodiment, each of the optical microstructures MS has an optical surface OS used as a light-transmitting plane, and no optical film is arranged on the optical surface OS. When the display light beam DB from below is transmitted to the optical microstructure MS, only a slight refraction will occur, and the display light beam DB will not be scattered or greatly attenuated. Regardless of the anti-peep display mode or the normal display mode, the display light beam DB may all pass through the optical microstructure MS. Therefore, the optical microstructure MS will not affect presentation of a display image formed by the display light beam DB. In this way, in the embodiment, since the arrangement of the optical microstructures MS does not affect an optical path of the display light beam DB, a distribution and positions of the optical microstructures MS may be relatively unlimited, and the optical microstructures MS may have a larger design margin.

Further, as shown in FIG. 1A and FIG. 1B, the optical surface OS of each of the optical microstructures MS is a side surface presenting an olive-shaped curved surface in the concave microstructure, which includes a first optical surface OS1 and a second optical surface OS2, where the first optical surface OS1 faces the first light incident surface IS1, the second optical surface OS2 faces the second light incident surface IS2, the first optical surface OS1 and the second optical surface OS2 are, for example, light-transmitting planes, the first optical surface OS1 is connected between the second optical surface OS2 and the first surface S1, the second optical surface OS2 is connected between the first optical surface OS1 and the first surface S1, and the first optical surface OS1 is located between the first light incident surface IS1 and the second optical surface OS2, and the second optical surface OS2 is located between the first optical surface OS1 and the second light incident surface IS2.

Moreover, as shown in FIG. 3, the light guide plate 132 has a first region RR, a central region RC and a second region RL, and the first region RR and the second region RL are respectively located on two sides of the central region RC. The first region RR is closer to the first light incident surface IS1 than the second region RL, the second region RL is closer to the second light incident surface IS2 than the first region RR, and the first region RR and the second region RL are separated by a central line or the central region RC between the first light incident surface IS1 and the second light incident surface IS2, and the first region RR includes a plurality of sub-regions RR1, RR2, RR3, RR4, and the second region RL includes a plurality of sub-regions RL1, RL2, RL3, RL4. Further, in the embodiment, a plurality of optical microstructures MSR1, MSR2, MSR3, MSR4 are arranged in the first region RR, a plurality of optical microstructures MSC are arranged in the central region RC, and a plurality of optical microstructures MSL1, MSL2, MSL3, MSLA are arranged in the second region RL. As shown in FIG. 3 to FIG. 5I, an area proportion of the first optical surface OS1 of each of the optical microstructures MS (such as anyone of the optical microstructures MSR1, MSR2, MSR3, MSR4, MSC, MSL1, MSL2, MSL3, MSL4) in the corresponding the optical microstructure MS (the corresponding one of the microstructures MSR1, MSR2, MSR3, MSR4, MSC, MSL1, MSL2, MSL3, MSL4) decreases gradually as getting farther away from the first light incident surface IS1, and an area proportion of the second optical surface OS2 of each of the optical microstructures MS (such as anyone of the optical microstructures MSR1, MSR2, MSR3, MSR4, MSC, MSL1, MSL2, MSL3, MSL4) in the corresponding the optical microstructure MS (the corresponding one of the microstructures MSR1, MSR2, MSR3, MSR4, MSC, MSL1, MSL2, MSL3, MSLA) decreases gradually as getting farther away from the second light incident surface IS2. For example, in the embodiment, as shown in FIG. 4E and FIG. 5E, a range of the first optical surface OS1 of a part of the optical microstructures MSC in the central region RC is the same as a range of the second optical surface OS2. Moreover, taking the central region RC as a boundary, as shown in FIG. 4A to FIG. 4D and FIG. 5A to FIG. 5D, the range of the second optical surface OS2 of a part of the optical microstructures MSL1, MSL2, MSL3, MSL4 in the second region RL near the second light incident surface IS2 is greater than the range of the first optical surface OS1, as shown in FIG. 4F to FIG. 41 and FIG. 5F to FIG. 5I, the range of the first optical surface OS1 of a part of the optical microstructures MSR1, MSR2, MSR3, MSr4 in the first region RR near the first light incident surface IS1 is greater than the range of the second optical surface OS2.

In addition, as shown in FIG. 4A to FIG. 4D, FIG. 4F to FIG. 41 and FIG. 5A to FIG. 5D and FIG. 5F to FIG. 5I, the range of the first optical surface OS1 of a part of the optical microstructures MSR1, MSR2, MSR3, MSR4 in the first region RR is greater than the range of the first optical surface OS1 of a part of the optical microstructures MSL1, MSL2, MSL3, MSL4 in the second region RL. The range of the second optical surface OS2 of the part of the optical microstructures MSR1, MSR2, MSR3, MSR4 in the first region RR is smaller than the range of the second optical surface OS2 of the part of the optical microstructures MSL1, MSL2, MSL3, MSL4 in the second region RL.

On the other hand, as shown in FIG. 1A and FIG. 1B, there is a first included angle $\alpha1$ between the first optical surface OS1 of each of the optical microstructures MS and the first surface S1, and there is a second included angle $\alpha2$ between the second optical surface OS2 and the first surface S1, and a magnitude of the first included angle $\alpha1$ and a magnitude of the second included angle $\alpha2$ gradually changes as getting farther away from the first surface S1. The magnitude of the first included angle $\alpha1$ of the first optical surface OS1 of each of the optical microstructures MS gradually increases as getting farther away from the first surface S1. The magnitude of the second included angle $\alpha2$ of the second optical surface OS2 also gradually increases as getting farther away from the first surface S1. For example, as shown in FIG. 8A, in the embodiment, the optical surface OS (for example, the first optical surface OS1 or the second optical surface OS2) includes sub-optical surfaces SS1 and SS2, and there are sub-included angles $\beta1$ and $\beta2$ respectively between the sub-optical surfaces SS1 and SS2 and the first surface S1, and in the sub-included angles $\beta1$, $\beta2$, the sub-included angle 1 of the sub-optical surface SS1 farther away from the first surface S1 is larger than the sub-included angle $\beta2$ of the sub-optical surface SS2 closer to the first surface S1. In other words, the sub-included angles between the sub-optical surfaces SS1, SS2 and the first surface S1 gradually increase as getting farther away from the first surface S1, but the invention is not limited thereto. For example, in other embodiments, a magnitude of the first included angle $\alpha1$ of the first optical surface OS1 of each of the optical microstructures MS may gradually decrease as getting farther away from the first surface, and a magnitude of the second included angle $\alpha2$ of the second optical surface OS2 also gradually decrease as getting farther away from the first surface.

For example, as shown in FIG. 8B, the optical surface OS (such as the first optical surface OS1 or the second optical surface OS2) of each of the optical microstructures MS may include sub-optical surfaces SS3, SS4, and there are sub-included angles $\beta3$ and $\beta4$ respectively between the sub-optical surfaces SS3 and SS4 and the first surface S1, and in the sub-included angles $\beta3$, $\beta4$, the sub-included angle $\beta3$ of the sub-optical surface SS3 farther away from the first surface S1 is smaller than the sub-included angle $\beta4$ of the sub-optical surface SS4 closer to the first surface S1. In other words, the sub-included angles between the sub-optical surfaces SS3, SS4 and the first surface S1 gradually decrease as getting farther away from the first surface S1.

In this way, the optical surface OS of each of the optical microstructures MS may be matched with the changes of the sub-optical surfaces SS1, SS2, SS3, and SS4 thereof according to an actual situation to form the first included angle $\alpha1$ or the second included angle $\alpha2$ that gradually increases or decreases as getting away from the first surface S1. The first included angle $\alpha1$ that gradually increases or decreases as getting away from the first surface S1 may be independently matched with the second included angle $\alpha2$ that gradually increases or decreases as getting away from the first surface S1 to form various optical microstructures MS, which may be used to adjust a light intensity distribution to make a layout and design of the optical microstructures MS more flexible. In addition, in the embodiment, since the included angles between the optical sub-surfaces SS1, SS2, SS3, and SS4 gradually change, it is possible to alleviate a tendency of changes of the surface angles between the optical sub-surfaces SS1, SS2, SS3, and SS4. In this way, it avails a thermocompression molding process of the optical microstructures MS to result in easy producing.

Moreover, in the embodiment, a difference between the maximum value of the first included angle $\alpha1$ and the maximum value of the second included angle $\alpha2$ of a part of the optical microstructures MSC in the central region RC is smaller than a difference between the maximum value of the first included angle $\alpha1$ and the maximum value of the second included angle $\alpha2$ of a part of the optical microstructures MSR1, MSR2, MSR3, MSR4 in the first region RR, or the difference between the maximum value of the first included angle α1 and the maximum value of the second included angle α2 of a part of the optical microstructures MSC in the central region RC is smaller than a difference between the maximum value of the first included angle α1 and the maximum value of the second included angle α2 of a part of the optical microstructures MSL1, MSL2, MSL3, MSL4 in the second region RL.

For example, as shown in FIG. 3 to FIG. 5I, in the embodiment, the first optical surface OS1 and the second optical surface OS2 of a part of the optical microstructures MSC in the central region RC are mirror-symmetrical, i.e., the difference between the maximum value of the first included angle α1 of the part of the optical microstructures MS in the central region RC and the maximum value of the second included angle α2 is 0, and, as the distance from the central region RC increases, the difference between the maximum value of the first included angle α1 and the maximum value of the second included angle α2 of the optical microstructure MS becomes larger.

Further, as shown in FIG. 3 to FIG. 5I, in the embodiment, the maximum value of the first included angle α1 of the part of the optical microstructures MSR1, MSR2, MSR3, and MSR4 in the first region RR is smaller than the maximum value of the first included angle α1 of the part of the optical microstructures MSL1, MSL2, MSL3, and MSL4 in the second region RL, and the maximum value of the second included angle α2 of the part of the optical microstructures MSR1, MSR2, MSR3, MSR4 in the first region RR is greater than the maximum value of the second included angle α2 of the part of the optical microstructures MSL1, MSL2, MSL3, MSL4 in the second region RL. The maximum value of the first included angle α1 of the part of the optical microstructures MSR1, MSR2, MSR3, MSR4 in the first region RR is smaller than the maximum value of the second included angle α2, and the maximum value of the first included angle α1 of the part of the optical microstructures MSL1, MSL2, MSL3, MSL4 in the second region RL is greater than the maximum value of the second included angle α2.

Furthermore, in the embodiment, as getting father away from the first light incident surface IS1, the plurality of optical microstructures MS may have a distribution trend variation along with the magnitude of the maximum value of the first included angle α1 thereof. For example, in the embodiment, the maximum value of the first included angle α1 of the optical microstructure MSR4 is less than the maximum value of the first included angle α1 of the optical microstructure MSR3 (or the optical microstructure MSR2, the optical microstructure MSR1), and the maximum value of the second included angle α2 of the optical microstructure MSR4 is greater than the maximum value of the second included angle α2 of the optical microstructure MSR3 (or the optical microstructure MSR2, the optical microstructure MSR1), and a distribution density of the optical microstructure MSR4 in the sub-region RR4 close to the first light incident surface IS1 is greater than a distribution density of the optical microstructure MSR3 (or the optical microstructure MSR2, the optical microstructure MSR1), and a distribution density of the optical microstructure MSR3 (or the optical microstructure MSR2, the optical microstructure MSR1) in the sub-region RR3 (or the sub-region RR2, the sub-region RR1) farther away from the first light incident surface IS1 is greater than a distribution density of the optical microstructure MSR4, wherein the sub-region RR4 is located between the first light incident surface IS1 and the sub-region RR3 (or the sub-region RR2, the sub-region RR1).

Namely, as getting father away from the first light incident surface IS1, the distribution density of the optical microstructures MS (such as the optical microstructure MSR4) with the smaller first included angles α1 will become less, comparatively, the distribution density of the optical microstructures MS (such as the optical microstructures MSR3, MSR2, MSR1) with the larger first included angles α1 will become greater. On the other hand, similarly, as getting father away from the second light incident surface IS2, the distribution density of the optical microstructures MS (such as the optical microstructure MSL4) with the smaller second included angles α2 will become less, comparatively, the distribution density of the optical microstructures MS (such as the optical microstructure MSL3, the optical microstructure MSL2, the optical microstructure MSL1) with the larger second included angles α2 will become greater.

Moreover, as shown in FIG. 6A and FIG. 6B, in the embodiment, the first light beam PB1 and the second light beam PB2 are respectively emitted from two sides of a normal line of the light emitting surface of the light guide plate 132. Moreover, in the embodiment, along with a variation of the included angle between the optical surface OS of the optical microstructures MS and the first surface S1, a light emitting angle of the light beam is also changed accordingly. To be specific, as shown in FIG. 6A and FIG. 6B, the optical angle (the first included angle α1) of FIG. 6B is smaller than the optical angle (the first included angle α1) of FIG. 6A, and the optical angle (the second included angle α2) of FIG. 6B is smaller than the optical angle (the second included angle α2) of FIG. 6A. A light emitting angle of the light beam (the first light beam PB1 or the second light beam PB2) via the optical angle with a small angle (the first included angle α1 or the second included angle α2) will be larger than that a light emitting angle of the light beam (the first light beam PB1 or the second light beam PB2) via the optical angle with a larger angle (the first included angle α1 or the second included angle α2). In this way, as shown in FIG. 1A, FIG. 6A and FIG. 6B, as getting father away from the first light incident surface IS1, when the distribution density of the optical microstructures MS with the small first included angles α1 becomes less, a light emitting angle of the first light beam PB1 emitted from the light guide plate 132 via the first optical surface OS1 also be smaller. Similarly, as getting father away from the second light incident surface IS2, when the distribution density of the optical microstructures MS with the small second included angles α2 becomes less, a light emitting angle of the second light beam PB2 emitted from the light guide plate 132 via the second optical surface OS2 also be smaller.

For example, as shown in in FIG. 1A, on the light emitting surface, if the normal line perpendicular to the light emitting surface is 0 degree, a direction pointing towards the second light incident surface IS2 is −90 degrees and a direction pointing towards the first light incident surface IS1 is 90 degrees (i.e., a horizontal viewing angle), the light emitting angle of the first light beam PB1 emitted from the light guide plate 132 is between −10 degrees and 90 degrees, and the light emitting angle of the second light beam PB2 emitted from the light guide plate 132 is between −90 degrees and 10 degrees, this range varies along with a size of the screen and a designed target shielding angle. Here, the light emitting angle is an included angle between a transmission direction of the anti-peep light beam PB and the normal line of the light emitting surface (the second surface S2).

Further, in the embodiment, when simulation is carried out under the condition that the first light beam PB1 or the second light beam PB2 are parallel light, based on the law of refraction and reflection of optical principles, the light emitting angle of the first light beam PB1 or the second light beam PB2 may be calculated based on the first included angle α1 of the first optical surface OS1 and the second included angle α2 of the second optical surface OS2, and the equation thereof is as follows:

$$\theta = \sin^{-1}(n \cdot \sin(90° - 2a))$$

where n is a refractive index of the light guide plate 132, a is an optical angle of light incident to the optical microstructure MS (for example, one of the first included angle α1 and the second included angle α2), and θ is the light emitting angle.

Thus, through the above calculation, by further calculating a required light emitting angle of the first light beam PB1 or the second light beam PB2 that may block the viewer's image based on a viewing angle of a region where a bystander is located, a design range of the optical angles of the optical microstructures MS in the anti-peep display device 100 and the anti-peep light source module 130 is further calculated.

For example, as shown in FIG. 7A, when a size of the anti-peep display device 100 is 15 inches, considering a user with a clear vision distance of 50 cm and a viewing angle of 30°, regarding the first light beam PB12 emitted via the optical microstructures MS on the side away from the first light incident surface IS1 and the second light beam PB22 emitted via the optical microstructures MS on the side away from the second light incident surface IS2, the required minimum light emitting angles thereof must be 12°, and actual light emitting ranges thereof are between 12° and 90°. The minimum light emitting angles of the first light beam PB11 that emits via the optical microstructures MS on the side close to the first light incident surface IS1 and the second light beam PB21 that emits via the optical microstructures MS on the side close to the second light incident surface IS2 are required to be 42°, and the actual light emitting ranges thereof are between 42° and 90°. In another example, as shown in FIG. 7A, when the size of the anti-peep display device 100 is 19 inches, considering the user with a clear vision distance of 50 cm and a viewing angle of 30°, regarding the first light beam PB12 emitted via the optical microstructures MS on the side away from the first light incident surface IS1 and the second light beam PB22 emitted via the optical microstructures MS on the side away from the second light incident surface IS2, the required minimum light emitting angles thereof must be 7°, and the actual light emitting ranges thereof are between 7° and 90°. The minimum light emitting angles of the first light beam PB11 that emits via the optical microstructures MS on the side close to the first light incident surface IS1 and the second light beam PB21 that emits via the optical microstructures MS on the side close to the second light incident surface IS2 are required to be 46°, and the actual light emitting ranges thereof are between 46° and 90°.

Further, as shown in FIG. 1A and FIG. 7A, the light emitting range of the first light beam PB11 or the second light beam PB21 emitted from the first optical surface OS1 and the second optical surface OS2 of the optical microstructures MS near two side edges of the light guide plate 132 may also be closer to two sides of a viewing region UR1 of the user viewing the display image at a normal viewing angle. The light emitting range of the first light beam PB12 or the second light beam PB22 emitted from the first optical surface OS1 and the second optical surface OS2 of the optical microstructures MS away from the two side edges of the light guide plate 132 may also be farther away from the two sides of the viewing region UR1 of the user viewing the display image at the normal viewing angle. The light emitting range of the first light beam PB10 or the second light beam PB20 emitted from the first optical surface OS1 and the second optical surface OS2 of the optical microstructures MS away from a central portion of the light guide plate 132 may be located between the aforementioned two light emitting ranges.

In this way, by controlling the first light beam PB11 or the second light beam PB21 with the light emitting range closer to the two sides of the viewing region UR1 of the user viewing the display image with a normal viewing angle to have a larger minimum light emitting angle, it will not affect the scope of the viewing region UR1 of the user viewing from the normal viewing angle. Moreover, by controlling the first light beam PB12 or the second light beam PB22 with the light emitting range away from the two sides of the viewing region UR1 of the user viewing the display image with the normal viewing angle to have a smaller minimum light emitting angle, the anti-peep effect of the anti-peep display device 100 may be further ensured.

In this case, based on the above calculation, angle ranges of the first included angle α1 of the first optical surface OS1 and the second included angle α2 of the second optical surface OS2 of the optical microstructures MS closer to one side of the user are approximately 41° and 43°, respectively. After simulating relevant optical data, it may be obtained that the angle ranges of the first included angle α1 of the first optical surface OS1 and the second included angle α2 of the second optical surface OS2 of the optical microstructures MS closest to the side of the user satisfy a following expression:

$$a_M < (158.53° - \theta)/3.55 + 5°$$

where $a_M$ is the angle range of the first included angle α1 of the first optical surface OS1 and the second included angle α2 of the second optical surface OS2 of the optical microstructures MS closest to the side of the user. Moreover, based on the angle range of the first included angle α1 of the first optical surface OS1 and the second included angle α2 of the second optical surface OS2 of the optical microstructures MS closer to the side of the user, the angle range of the first included angle α1 of the first optical surface OS1 and the second included angle α2 of the second optical surface OS2 of the optical microstructures MS away from the side of the user may be further deduced.

In this way, as shown in FIG. 1A and FIG. 7A, in the embodiment, the first light beam PB1 provided by the first light emitting element 131a1 enters the light guide plate 132 through the first light incident surface IS1, and the second light beam PB2 provided by the second light emitting element 131a2 enters the light guide plate 132 through the second light incident surface IS2. Moreover, at least a part of the first light beam PB1 is reflected (total reflection) by the first optical surface OS1 of the optical microstructure MS to emit out, and at least a part of the second light beam PB2 is reflected (total reflection) by the second optical surface OS2 of the optical microstructure MS to emit out. In other words, at least a part of the anti-peep light beam PB is totally reflected by the optical surface OS and then emitted from the light guide plate 132.

Moreover, in the embodiment, in the anti-peep display device 100, through an appropriate design of the angle ranges of the first included angle α1 of the first optical surface OS1 and the second included angle α2 of the second optical surface OS2, on the light emitting surface, regarding the anti-peep light beam PB emitted from the light guide plate 132, a light emitting angle of the first light beam PB1 thereof is between −10° and 90°, and the light emitting angle of the second light beam PB2 is between −90° and 10°.

In this way, as shown in FIG. 1A, FIG. 2A and FIG. 7A, in the anti-peep display mode, since the bystanders who watch the display image in a large viewing angle may simultaneously view the display light beam DB and the first light beam PB1 or the second light beam PB2 with appropriate different viewing angles, as shown in FIG. 2A, the bystanders will see an almost completely white image due to existence of the high-brightness anti-peep light beam PB, so as to achieve the anti-peep function. Moreover, since the light emitting angle of the anti-peep light beam PB does not include a normal viewing angle (with a direction coincided with a normal line perpendicular to the light emitting surface), it will not affect the viewing quality of users viewing the display image at the normal viewing angle. In this way, while the anti-peep display device may provide the anti-peep function, it may also provide an image with good image quality for users watching from the normal viewing angle.

On the other hand, as shown in FIG. 1B and FIG. 2B, in a normal display mode, the anti-peep display device 100 only provides the display light beam DB. At this time, without the interference of the high-brightness anti-peep light beam PB, users at different viewing angles may normally watch the image displayed by the anti-peep display device 100.

Moreover, as shown in FIG. 1A and FIG. 7A, since the first light beam PB1 and the second light beam PB2 may be independently controlled and emitted by the first light emitting element 131$a$1 and the second light emitting element 131$a$2, under the anti-peep display mode, when only one side of the user viewing the display image from the normal viewing angle has a bystander nearby, only one of the first light emitting element 131$a$1 and the second light emitting element 131$a$2 may be selectively turned on depending on the situation, and only the first light beam PB1 or the second light beam PB2 may be provided to achieve the anti-peep function.

Furthermore, compared with an anti-peep display device 100' shown in FIG. 7B, the anti-peep display device 100 shown in FIG. 1A and FIG. 7A has a larger viewing region for the users viewing from the normal viewing angle, and the display image viewed from the normal viewing angle has better contrast and image quality. To be specific, the anti-peep display device 100' shown in FIG. 7B has a structure similar to that of the anti-peep display device 100, but the plurality of used optical microstructures MS' are the same as each other and do not differ due to a location difference, and the first included angle α1 of the first optical surface OS1 thereof and the second included angle α2 of the second optical surface OS2 have a same fixed value. In this way, as shown in FIG. 7B, the light emitting angles of the first light beam PB1 and the second light beam PB2 emitted via the optical microstructures MS' are also approximately the same, and a light emitting range of the first light beam PB1 or the second light beam PB2 emitted from the first optical surface OS1 and the second optical surface OS2 of the optical microstructures MS close to the two side edges of the light guide plate 132 is also closer to the two sides of the user viewing the display image in the normal viewing angle. In this way, a viewing position of the user who may normally view the display image in the normal viewing angle is limited to the viewing region UR1, and when viewing beyond the scope of the viewing region UR1, the user starts to be affected by the high-brightness anti-peep light beam PB, which affects a contrast of the display image viewed by the user viewing from the normal viewing angle. On the other hand, for the bystander viewing in a large viewing angle, if the bystander is located in a region between the viewing region UR1 and a viewing region UR2, since the light emitting range of the first light beam PB1 or the second light beam PB2 emitted from the first optical surface OS1 and the second optical surface OS2 of the optical microstructures MS away from the two side edges of the light guide plate 132 may pass through an outer side of the bystander, the first light beam PB1 and the second light beam PB2 cannot affect the bystander. Therefore, a luminous flux of the high-brightness anti-peep light beam PB that may be used to shield the image viewed by the bystander will also be reduced, and effective shielding cannot be achieved, thereby making the anti-peep effect of the anti-peep display device 100' unable to achieve the anti-peep effect of the anti-peep display device 100. Namely, the anti-peep display device 100' may only produce sufficient anti-peep effect for the bystanders located in the viewing region UR2, so that the anti-peep performance of the anti-peep display device 100' is limited, and is not as good as the anti-peep effect of the anti-peep display device 100 of the embodiment of the invention.

In summary, in an embodiment of the invention, through the configuration of the optical microstructures of the anti-peep light source module, and under the anti-peep display mode, the anti-peep display device may enable at least a part of the anti-peep light beams to be fully reflected by the optical surface and then emitted from the light guide plate in an appropriate viewing angle based on a situation of a light emitting position with different distances from the light incident surface, so that the images viewed by bystanders may also be shielded due to the existence of the high-brightness anti-peep light beam and the bystanders may view an almost completely white image, thereby achieving the anti-peep function. In addition, since a light emitting angle of the anti-peep light beam does not include a normal viewing angle (with a direction coincided with a normal line perpendicular to the light emitting surface), it will not affect the viewing quality of users viewing the display image at the normal viewing angle. In this way, while the anti-peep display device may provide the anti-peep function, it may also provide an image with good image quality for users watching from the normal viewing angle.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An anti-peep light source module, comprising:
   a light guide plate, having a first light incident surface, a second light incident surface and a first surface, wherein the first light incident surface and the second light incident surface are opposite to each other, the first surface connects the first light incident surface and the second light incident surface, and the light guide plate has a first region and a second region, the first region is closer to the first light incident surface than the second region, and the second region is closer to the second light incident surface than the first region;
   a first light emitting element, facing the first light incident surface for providing a first light beam, and the first light beam entering the light guide plate through the first light incident surface;
   a second light emitting element, facing the second light incident surface for providing a second light beam, and the second light beam entering the light guide plate through the second light incident surface; and
   a plurality of optical microstructures, disposed on the first surface, wherein each of the plurality of optical microstructures has a first optical surface and a second optical surface, the first optical surface faces the first light incident surface, and the second optical surface faces the second light incident surface, and the first optical surface is located between the first light incident surface and the second optical surface, wherein there is a first included angle between the first optical surface of each of the plurality of optical microstructures and the first surface, there is a second included angle between the second optical surface and the first surface, and a magnitude of the first included angle and a magnitude of the second included angle gradually change as getting farther away from the first surface.

2. The anti-peep light source module as claimed in claim 1, wherein the light guide plate further has a central region, the first region and the second region are respectively located on two sides of the central region, and a difference between a maximum value of the first included angle and a maximum value of the second included angle of a part of the plurality of optical microstructures in the central region is smaller than a difference between a maximum value of the first included angle and a maximum value of the second included angle of a part of the plurality of optical microstructures in the first region or the second region.

3. The anti-peep light source module as claimed in claim 2, wherein the difference between the maximum value of the first included angle and the maximum value of the second included angle of the part of the plurality of optical microstructures in the central region is zero.

4. The anti-peep light source module as claimed in claim 1, wherein the maximum value of the first included angle of the part of the plurality of optical microstructures in the first region is smaller than the maximum value of the first included angle of the part of the plurality of optical microstructures in the second region, and the maximum value of the second included angle of the part of the plurality of optical microstructures in the first region is greater than the maximum value of the second included angle of the part of the plurality of optical microstructures in the second region.

5. The anti-peep light source module as claimed in claim 1, wherein the maximum value of the first included angle of the part of the plurality of optical microstructures in the first region is smaller than the maximum value of the second included angle, and the maximum value of the first included angle of the part of the plurality of optical microstructures in the second region is greater than the maximum value of the second included angle.

6. The anti-peep light source module as claimed in claim 1, wherein the plurality of optical microstructures comprise a plurality of first optical microstructures and a plurality of second optical microstructures, wherein a maximum value of the first included angle of the plurality of first optical microstructures is smaller than a maximum value of the first included angle of the plurality of second optical microstructures, a maximum value of the second included angle of the plurality of first optical microstructures is greater than a maximum value of the second included angle of the plurality of second optical microstructures, and a distribution density of the plurality of first optical microstructures in a first sub-region close to the first light incident surface is greater than a distribution density of the plurality of second optical microstructures, and a distribution density of the plurality of second optical microstructures in a second sub-region away from the first light incident surface is greater than a distribution density of the plurality of first optical microstructures, wherein the first sub-region is located between the first light incident surface and the second sub-region.

7. The anti-peep light source module as claimed in claim 1, wherein the magnitude of the first included angle gradually increases as getting farther away from the first surface.

8. The anti-peep light source module as claimed in claim 1, wherein the magnitude of the first included angle gradually decreases as getting farther away from the first surface.

9. The anti-peep light source module as claimed in claim 1, wherein the magnitude of the second included angle gradually increases as getting farther away from the first surface.

10. The anti-peep light source module as claimed in claim 1, wherein the magnitude of the second included angle gradually decreases as getting farther away from the first surface.

11. An anti-peep display device, configured to be switched between an anti-peep display mode and a normal display mode, and the anti-peep display device comprising:
   a display module, configured to provide a display light beam; and
   an anti-peep light source module, disposed on a transmission path of the display light beam, and the anti-peep light source module comprising:

a light guide plate, having a first light incident surface, a second light incident surface and a first surface, wherein the first light incident surface and the second light incident surface are opposite to each other, the first surface connects the first light incident surface and the second light incident surface, and the light guide plate has a first region and a second region, the first region is closer to the first light incident surface than the second region, and the second region is closer to the second light incident surface than the first region;

a first light emitting element, facing the first light incident surface for providing a first light beam, and the first light beam entering the light guide plate through the first light incident surface;

a second light emitting element, facing the second light incident surface for providing a second light beam, and the second light beam entering the light guide plate through the second light incident surface; and a plurality of optical microstructures, disposed on the first surface, wherein each of the plurality of optical microstructures has a first optical surface and a second optical surface, the first optical surface faces the first light incident surface, and the second optical surface faces the second light incident surface, and the first optical surface is located between the first light incident surface and the second optical surface, wherein there is a first included angle between the first optical surface of each of the plurality of optical microstructures and the first surface, there is a second included angle between the second optical surface and the first surface, and a magnitude of the first included angle and a magnitude of the second included angle gradually change as getting farther away from the first surface.

12. The anti-peep display device as claimed in claim 11, wherein the light guide plate further has a central region, the first region and the second region are respectively located on two sides of the central region, and a difference between a maximum value of the first included angle and a maximum value of the second included angle of a part of the plurality of optical microstructures in the central region is smaller than a difference between a maximum value of the first included angle and a maximum value of the second included angle of a part of the plurality of optical microstructures in the first region or the second region.

13. The anti-peep display device as claimed in claim 12, wherein the difference between the maximum value of the first included angle and the maximum value of the second included angle of the part of the plurality of optical microstructures in the central region is zero.

14. The anti-peep display device as claimed in claim 11, wherein the maximum value of the first included angle of the part of the plurality of optical microstructures in the first region is smaller than the maximum value of the first included angle of the part of the plurality of optical microstructures in the second region, and the maximum value of the second included angle of the part of the plurality of optical microstructures in the first region is greater than the maximum value of the second included angle of the part of the plurality of optical microstructures in the second region.

15. The anti-peep display device as claimed in claim 11, wherein the maximum value of the first included angle of the part of the plurality of optical microstructures in the first region is smaller than the maximum value of the second included angle, and the maximum value of the first included angle of the part of the plurality of optical microstructures in the second region is greater than the maximum value of the second included angle.

16. The anti-peep display device as claimed in claim 11, wherein the plurality of optical microstructures comprise a plurality of first optical microstructures and a plurality of second optical microstructures, wherein a maximum value of the first included angle of the plurality of first optical microstructures is smaller than a maximum value of the first included angle of the plurality of second optical microstructures, a maximum value of the second included angle of the plurality of first optical microstructures is greater than a maximum value of the second included angle of the plurality of second optical microstructures, and a distribution density of the plurality of first optical microstructures in a first sub-region close to the first light incident surface is greater than a distribution density of the plurality of second optical microstructures, and a distribution density of the plurality of second optical microstructures in a second sub-region away from the first light incident surface is greater than a distribution density of the plurality of first optical microstructures, wherein the first sub-region is located between the first light incident surface and the second sub-region.

17. The anti-peep display device as claimed in claim 11, wherein the magnitude of the first included angle gradually increases as getting farther away from the first surface.

18. The anti-peep display device as claimed in claim 11, wherein the magnitude of the first included angle gradually decreases as getting farther away from the first surface.

19. The anti-peep display device as claimed in claim 11, wherein the magnitude of the second included angle gradually increases as getting farther away from the first surface.

20. The anti-peep display device as claimed in claim 11, wherein the magnitude of the second included angle gradually decreases as getting farther away from the first surface.

* * * * *